(12) United States Patent
Erhardt et al.

(10) Patent No.: US 6,489,438 B1
(45) Date of Patent: Dec. 3, 2002

(54) FERTILIZER FORMULATIONS COMPRISING POLYSULFONIC ACIDS

(75) Inventors: Klaus Erhardt, Leimen (DE); Matthias Rädle, Weisenheim (DE); Vilmos Czikkely, Mannheim (DE); Gerd Bühler, Speyer (DE)

(73) Assignee: Compo Gesellschaft MbH & Co., KG, Muenster (DE)

( * ) Notice: Subject to any disclaimer, the term of this patent is extended or adjusted under 35 U.S.C. 154(b) by 0 days.

(21) Appl. No.: 09/716,834

(22) Filed: Nov. 20, 2000

(30) Foreign Application Priority Data

Dec. 3, 1999 (DE) .......................... 199 58 269

(51) Int. Cl.⁷ .................. C08G 25/24; C08G 73/06
(52) U.S. Cl. ................. 528/391; 528/373; 528/422; 528/423; 71/11; 71/27; 71/28
(58) Field of Search ............... 528/391, 373, 528/422, 423; 71/11, 27, 28

(56) References Cited

U.S. PATENT DOCUMENTS

| | | | |
|---|---|---|---|
| 3,565,599 A | 2/1971 | Sor et al. .................. 71/28 |
| 3,635,690 A | 1/1972 | Griffith ....................... 71/1 |
| 4,522,642 A | 6/1985 | Arndt et al. ................ 71/11 |
| 4,673,429 A | 6/1987 | Rieber et al. ............... 71/27 |
| 5,047,551 A | 9/1991 | Baus et al. ................ 548/375 |
| 5,128,480 A | 7/1992 | Merkle et al. ............. 548/373 |

FOREIGN PATENT DOCUMENTS

| | | |
|---|---|---|
| DE | 41 28 828 | 3/1993 |
| DE | 196 31 764 | 2/1998 |
| DE | 198 49 496 | 6/1999 |
| EP | 467 707 | 1/1992 |
| GB | 960 109 | 6/1964 |

OTHER PUBLICATIONS

Noyce et al. "The Ultraviolet Absorption Spectra of Substituted Pyrazoles" Journal of Organic Chemistry vol. 20. (1955) pp. 1681–1686.

Hüttel et al "Die Chlorierung der Pyrazole" Annalen Der Chemie Band 597 (1955) pp. 186–197.

Primary Examiner—Duc Truong
(74) Attorney, Agent, or Firm—Keil & Weinkauf

(57) ABSTRACT

Fertilizer formulations comprising polysulfonic acid together with inorganic fertilizers or slurry or liquid fertilizers and one or more nitrification inhibitors.

7 Claims, No Drawings

FERTILIZER FORMULATIONS COMPRISING POLYSULFONIC ACIDS

The present invention relates to fertilizer formulations comprising polysulfonic acids together with inorganic fertilizers or slurry or liquid fertilizers and one or more nitrification inhibitors.

The fertilizers which are employed to provide plants in agriculture with the nitrogen they require are essentially ammonium compounds.

Ammonium compounds are converted in the soil microbially within a relatively short time into nitrate (nitrification). However, nitrate can be leached from the soil and thus reach the groundwater. The leachate is no longer available for plant nutrition, which is why rapid nitrification is undesirable. This is why nitrification inhibitors are added to the fertilizer to improve fertilizer utilization. A known group of nitrification inhibitors are, for example, pyrazoles.

However, pyrazoles are highly volatile. Thus, when fertilizer products comprising pyrazoles are stored, the active ingredient is lost continuously by evaporation. This is why suitable measures are required to formulate the pyrazoles in a nonvolatile form.

DE-A-196 31 764 discloses the use of inorganic and organic polyacids for the treatment of inorganic fertilizers comprising a nitrification inhibitor. Inorganic polyacids which are described are, inter alia, polyphosphoric acid and polysilicic acid, and organic polyacids which described are exclusively polycarboxylic acids such as poly(meth)acrylic acid.

These fertilizer formulations were still in need of improvement.

DE-A-198 49 496 discloses nonvolatile alkyl derivatives. The latter are based on the alkyl pyrazoles and their production requires additional chemical manipulation, thus making the production complicated when compared to the simple alkyl pyrazoles and their salts.

It is an object of the present invention to overcome the abovementioned disadvantages, thus arriving at improved, yet simple to produce, fertilizer formulations.

We have found that this object is achieved by novel and improved fertilizer formulations comprising polysulfonic acids together with inorganic fertilizers or slurry or liquid fertilizers and one or more nitrification inhibitors.

The fertilizer formulations can be produced as follows:

Inorganic fertilizers, slurry or liquid fertilizers can be treated with one or more, preferably one to three, especially preferably one or two, in particular one nitrification inhibitor(s) and one or more, preferably one to three, especially preferably one or two, in particular one, polysulfonic acid(s). The polysulfonic acid can exist in neutral or, preferably, in acid-stabilized form. Polysulfonic acid(s) and nitrification inhibitor(s) can be mixed with the inorganic fertilizer, the slurry or the liquid fertilizer in succession in any desired sequence or jointly. It is also possible to apply, to the soil to be treated, a mixture comprising inorganic fertilizers, slurry or liquid fertilizers and nitrification inhibitor(s) and to apply, to the soil to be treated, polysulfonic acid(s) subsequently, yet within the same fertilizing period. Application in reverse order, where first polysulfonic acid(s) and only then the mixture comprising inorganic fertilizers, slurry or liquid fertilizers and nitrification inhibitor(s) is/are applied, is also possible.

In the case of inorganic fertilizers, nitrification inhibitor(s) and polysulfonic acid(s) can be applied to the granule surface as a thin layer or film, for example by soaking, spraying, dropwise application or during the granulation process, preferably by dropwise application or spraying on, especially preferably by dropwise application. The inorganic fertilizer can be treated with (the) nitrification inhibitor(s) and (the) polysulfonic acid(s), for example, in a liquid preparation, for example a solution of suspension of the polysulfonic acid(s) and the nitrification inhibitor(s) in succession in any desired sequence or jointly, for example by soaking, spraying on, dropwise application or during the granulation process, preferably dropwise application or spraying on, especially preferably dropwise application (DE-A-41 28 828). To achieve a more rapid removal of the solvent or suspending agent, for example water,—and this is preferred—, it is possible to preheat the inorganic fertilizer and/or the solution or suspension, or the solvent or suspending agent can be stripped off from the fertilizer formulation by evaporation in vacuo. It is also possible to use melts of polysulfonic acid(s) and nitrification inhibitor(s).

The preparation of the pyrazoles I is disclosed, for example, in EP-A-474 037, DE-A-3 840 342 or EP-A-467 707. To prepare N-hydroxymethylpyrazoles, the pyrazoles in question can be reacted in methanol with formalin solution, excess solvent can be evaporated, and the N-hydroxymethylpyrazoles can be obtained as solids. 3,4-dimethylpyrazole can be prepared as described in J.Org.Chem. 20, (1955), 1681 to 1682.

Acid addition salts of the pyrazoles I can be obtained by reacting the pyrazoles I for example with an equivalent of a corresponding acid. The preparation of the hydrochloride of 4-chloro-3-methylpyrazole is known from Liebigs Anm. Chem. 598, (1956), pages 186 and 194.

If the fertilizer formulation involves an inorganic fertilizers, the nitrification inhibitor can be present in a mixture or on the surface of the inorganic fertilizer. The nitrification inhibitor is preferably present in a mixture with the polysulfonic acid.

As a rule, fertilizer formulations comprise inorganic fertilizers, slurry or liquid fertilizers as main constituent and 0.001 to 5% by weight, preferably 0.005 to 3% by weight, especially preferably 0.01 to 1.5% by weight, in particular 0.05 to 1% by weight, of nitrification inhibitor and 0.001 to 5% by weight, preferably 0.005 to 3% by weight, especially preferably 0.01 to 1.5% by weight, in particular 0.05 to 1% by weight, of polysulfonic acid.

The following are suitable as polysulfonic acids:

Poly[$C_1$- to $C_8$-alkyl]sulfonic acids, preferably poly[$C_1$- to $C_4$-alkyl]sulfonic acids such as poly[methyl]sulfonic acid, poly[ethyl]sulfonic acid, poly[n-propyl]sulfonic acid, poly[isopropyl]sulfonic acid, poly[n-butyl]sulfonic acid, poly[isobutyl]sulfonic acid, poly[sec-butyl]sulfonic acid and poly[tert-butyl]sulfonic acid, poly[aryl]sulfonic acids such as poly[phenyl]sulfonic acid, poly[tolyl]sulfonic acid, poly[xylyl]sulfonic acid, poly[1-naphthalene]sulfonic acid and poly[2-naphthalene]sulfonic acid, poly [1,n-naphthalene] disulfonic acids (where n=2 to 8), 2-, 3- or 9-methylnaphthalenesulfonic acid, condensates of 1- or 2-naphthalenesulfonic acid with formaldehyde.

Examples of suitable inorganic fertilizers are fertilizers comprising ammonium and/or urea. Examples of fertilizers compromising ammonia are nitrogen/phosphorus/potash (NPK) fertilizers, nitrochalk, ammonium sulfa-nitrate (ASM), ammonium sulfate and ammonium phosphate, ammonium nitrate or diammonium phosphate.

The inorganic fertilizers can exist in the form of a powder or granules.

The following are suitable as liquid fertilizers:

All nutrient mixtures comprising $NH_3$—N or $NH_4$—N such as ammonium nitrate, ammonium nitrate/urea solutions, aqueous ammonia, ammonium sulfate, monoammonium phosphate, diammonium phosphate, in each case as solution or suspension.

A suitable slurry is any type of slurry, independently of its origin and its source.

Suitable nitrification inhibitors are all nitrification inhibitors.

It is especially expedient to employ the polyacids used in accordance with the invention for treating inorganic fertilizers comprising in particular pyrazole compounds as nitrification inhibitors. "Pyrazole compounds" are to be understood as meaning all pyrazole compounds which have a nitrification-inhibiting action, as they are described, for example, in U.S. Pat. Nos. 3,635,690, 4,522,642 and DE-A 4 128 828.

Preferred pyrazoles are those of the formula I

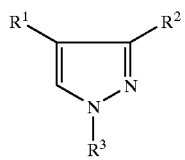

(I)

in which $R^1$, $R^2$ and $R^3$ independently of one another are hydrogen, $C_1$–$C_{20}$-alkyl, $C_3$–$C_8$-cycloalkyl, aryl, $C_7$–$C_{20}$-alkylaryl which is unsubstituted or mono- to trisubstituted by $C_1$–$C_{20}$-alkyl, halogen and/or hydroxyl, or else halogen or nitro, and $R^3$ is additionally $C_1$–$C_8$-hydroxyalkyl or $C_2$–$C_8$-hydroxycarbonylalkyl.

The substituents $R^1$, $R^2$ and $R^3$ in formula I have the following meanings:

hydrogen, $C_1$–$C_{20}$-alkyl, preferably $C_1$–$C_8$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, n-hexyl, iso-hexyl, sec-hexyl, n-heptyl, iso-heptyl, n-octyl, iso-octyl, especially preferably $C_1$–$C_4$-alkyl such as methyl, ethyl, n-propyl, iso-propyl, n-butyl, iso-butyl, sec-butyl and tert-butyl, in particular methyl and ethyl, $C_3$–$C_8$-cycloalkyl such as cyclopropyl, cyclobutyl, cyclopentyl, cyclohexyl and cyclooctyl, especially preferably cyclopentyl and cyclohexyl, aryl such as phenyl, 1-naphthyl, 2-naphthyl, 1-anthryl, 2-anthryl and 9-anthryl, preferably phenyl, 1-naphthyl and 2-naphthyl, especially preferably phenyl, $C_7$–$C_{20}$-alkylaryl, preferably $C_7$–$C_{12}$-alkylphenyl such as 2-methylphenyl, 3-methylphenyl, 4-methylphenyl, 2,4-dimethylphenyl, 2,5-dimethylphenyl, 2,6-dimethylphenyl, 3,4-dimethylphenyl, 3,5-dimethylphenyl, 2,3,4-trimethylphenyl, 2,3,5-trimethylphenyl, 2,3,6-trimethylphenyl, 2,4,6-trimethylphenyl, 2-ethylphenyl, 3-ethylphenyl, 4-ethylphenyl, 2-n-propylphenyl, 3-n-propylphenyl and 4-n-propylphenyl, halogen such as fluorine, chlorine, bromine and iodine, preferably fluorine, chlorine and bromine, especially preferably fluorine and chlorine, nitro, $R^3$ is additionally $C_1$–$C_8$-hydroxyalkyl, preferably $C_1$–$C_4$-hydroxyalkyl such as hydroxymethyl, hydroxyethyl, hydroxy-n-propyl, hydroxy-iso-propyl and hydroxy-n-butyl, especially preferably hydroxymethyl and hydroxyethyl, in particular hydroxymethyl, $C_2$–$C_8$-hydroxycarbonylalkyl, preferably $C_2$–$C_4$-hydroxycarbonylalkyl such as hydroxycarbonylmethyl, hydroxycarbonylethyl, hydroxycarbonyl-n-propyl and hydroxycarbonyl-iso-propyl.

Particularly suitable as nitrification inhibitors are pyrazoles of the formula I in which $R^1$ is hydrogen, halogen or $C_1$–$C_4$-alkyl, $R^2$ is $C_1$–$C_4$-alkyl and $R^3$ is hydrogen or $CH_2OH$, and pyrazoles of the formula I in which $R^1$ is halogen or $C_1$–$C_4$-alkyl, $R^2$ is $C_1$–$C_4$-alkyl and $R^3$ is hydrogen, $CH_2CH_2COOH$ or $CH_2CH(CH_3)COOH$.

The pyrazoles I can be employed in the basic form or in the form of acid addition salts with inorganic mineral acids and organic acids. Inorganic mineral acids which are suitable are, for example, hydrochloric acid, phosphoric acid, sulfuric acid, nitric acid or mixtures of these, preferably phosphoric acid. Examples of suitable organic acids are $C_2$–$C_8$-carboxylic acids such as formic acid and acetic acid or fatty acids or monoethylenically unsaturated mono- or dicarboxylic acids with 3 to 6 C atoms or their corresponding anhydrides, such as, for example, acrylic acid, methacrylic acid, ethylacrylic acid, allylacrylic acid, crotonic acid, vinylacetic acid, maleic acid, itaconic acid, mesaconic acid, fumaric acid, citraconic acid, methylenemalonic acid, and their esters, such as, for example, monoalkyl maleate or mixtures of these. In the case of monoalkyl dicarboxylates, the indicated number of C atoms refers to the dicarboxylic acid skeleton, while the alkyl group in the ester residue can have 1 to 20 C atoms, preferably 1 to 8 C atoms, in particular 1 to 4 C atoms, independently of the former. Suitable monoethylenically unsaturated dicarboxylic anhydrides are maleic anhydride, itaconic anhydride, citraconic anhydride and mixtures of these. Substances which are preferably employed are acrylic acid, methacrylic acid, maleic acid, itaconic acid and maleic anhydride. Acrylic acid is especially preferably employed.

These monomers which comprise carboxyl groups or carboxylic acid groups can be homopolymerized or copolymerized with other vinylic monomers such as, for example, $C_1$–$C_8$-alkylenes, preferably $C_1$–$C_4$-alkylenes, in particular ethylene or propylene.

The inorganic or organic polyacids can be employed as free acids or as partially neutralized ammonium, alkali metal or alkaline earth metal salts. Preferably, the polyacids are employed as free acids.

Examples of suitable salts are also hydrochlorides and phosphoric acid addition salts.

The pyrazole compounds can be employed singly or in the form of mixtures.

Especially preferred pyrazole compounds are 3,4-dimethylpyrazole, 4-chloro-3-methylpyrazole, N-hydroxymethyl-3,4-dimethylpyrazole, N-hydroxymethyl-4-chloro-3-methylpyrazole and the phosphoric acid addition salts of 3,4-dimethylpyrazole and 4-chloro-3-methylpyrazole, or else hydrochloride of 3,4-dimethylpyrazole.

The fertilizer formulations according to the invention are suitable in a fertilization method for application to soils, preferably application to arable soils, especially preferably to arable soils for maize, cotton, wheat, rice, barley and/or sugar beet crops.

The amount of applied fertilizer formulations according to the invention can vary within wide limits and is, as a rule, 50 to 6,000 kg/ha, preferably 150 to 3,000 kg/ha, especially preferably 300 to 2,000 kg/ha.

EXAMPLES

Storage Experiment

The storage experiments were carried out in controlled-environment cabinets in which a constant temperature of 30° C. and a constant relative atmospheric humidity of 60% were set.

The samples were weighed into shallow glass dishes 6 cm in diameter so that 10 g of fertilizer are stored in the form of an shallow bed.

In the controlled-environment cabinets, atmospheric pressure prevailed and the air was changed 4 times per hour.

Also, care was taken that the local flow rates within the controlled-environment cabinet were site-independent so that each sample was exposed to identical evaporation conditions.

An improved stabilization was achieved for example in the case of NPK (nitrogen/phosphorus/potash) fertilizers, in the case of NP fertilizers and in the case of pure nitrogen fertilizers such as, for example, urea and ASN (ammonium sulfa-nitrate).

The fertilizers listed are usually characterized by their nutrient contents (20+8+8 means 20% N, 8% $P_2O_5$, 8% $K_2O$). The fourth figure relates to the magnesium content.

TABLE 1

Storage experiments with pyrazoles on fertilizers
4-week storage experiments

| Pyrazole carrier | Pyrazole | Date of the beginning of the storage experiment | Date of the end of the storage experiment | Date of the analysis before the storage experiment | % relative loss A/B | % relative loss, average |
|---|---|---|---|---|---|---|
| 13 + 9 + 16 + 4 | 3,4-DMPP | 01.26.98 | 02.23.98 | 01.22.98 | 38.3 30.9 | 34.6 |
| 13 + 9 + 16 + 4 | 3,4-DMP V melt | 01.26.98 | 02.23.98 | 01.22.98 | 7.6 4.6 | 6.1 |
| ASN | 3,4-DMP phosphate | 01.26.98 | 02.23.98 | 01.22.98 | 10.0 18.6 | 14.3 |
| ASN | 3,4-DMP V melt | 01.26.98 | 02.23.98 | 01.22.98 | 1.4 1.8 | 1.6 |
| Urea | 3,4-DMPP | 07.01.99 | 07.29.99 | 07.29.99 | 67.8 47.2 | 57.5 |
| Urea | 3,4-DMP V melt | 02.08.99 | 03.08.99 | 03.09.99 | 8.4 4.7 | 6.6 |
| 20 + 8 + 8 | 3,4-DMPP | 11.02.98 | 11.30.98 | 11.17.98 | 50.6 46.2 | 48.4 |
| 20 + 8 + 8 | 3,4-DMP V melt | 11.02.98 | 11.30.98 | 11.17.98 | −2.4 4.6 | 1.1 |
| 22 + 13 + 0 | 3,4-DMPP | 08.17.98 | 08.31.98 | 08.10.98 | 100.0 100.0 100.0 | 100.0 |
| 22 + 13 + 0 | 3,4-DMP V melt | 11.02.98 | 11.30.98 | 11.17.98 | 0.7 5.0 | 2.9 |
| 18 + 5 + 10 | 3,4-DMPP | 08.17.98 | 08.31.98 | 08.10.98 | 100.0 100.0 100.0 | 100.0 |
| 18 + 5 + 10 | 3,4-DMP V melt | 11.02.98 | 11.30.98 | 11.17.98 | 1.3 1.2 | 1.2 |
| 24 + 0 + 0 + 3 | 3,4-DMPP | 05.28.98 | 06.22.98 | 06.23.98 | 100.0 | 100.0 |
| 24 + 0 + 0 + 3 | 3,4-DMP V melt | 02.08.99 | 03.08.99 | 03.09.99 | 34.1 18.2 12.2 | 21.5 |
| 12 + 12 + 17 | 3,4-DMPP | 07.01.99 | 07.29.99 | 07.29.99 | 100.0 100.0 | 100.0 |
| 12 + 12 + 17 | 3,4-DMP V melt | 02.08.99 | 03.08.99 | 03.09.99 | 21.0 12.8 18.8 | 17.6 |

It was found in preliminary experiments that these conditions effected very good simulation of the volatility at the surface of piled-up material under realistic conditions. In the example, the samples were removed after 4 weeks' storage in the sealed cabinet, and the sample was ground and the DMP content in the extraction solution was determined by HPLC in comparison with the pre-storage content. The experiment can also be carried out with shorter or longer storage times.

The abbreviations in Table 1 denote:

DMP=dimethylpyrazole

DMPP=dimethylpyrazole phosphate

V melt=polynaphthalenesulfonic acid

It can be seen from Table 1 below that the use of polysulfonic acids leads to a markedly improved stabilization.

We claim:

1. A fertilizer formulation comprising, mixed together with an inorganic fertilizer or slurry or liquid fertilizer, one or more polysulfonic acids and, as a nitrification inhibitor, at least one pyrazole of the formula (I):

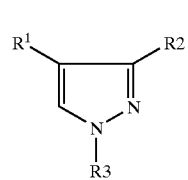

wherein $R^1$ is hydrogen, halogen or $C_1$–$C_4$-alkyl, $R^2$ is $C_1$–$C_4$-alkyl and $R^3$ is hydrogen or $CH_2OH$, and pyrazoles of the formula I in which $R^1$ is halogen or $C_1$–$C_4$-alkyl, $R^2$ is $C_{1-C4}$-alkyl and $R^3$ is hydrogen, $CH_2CH_2COOH$ or $CH_2CH(CH_3)COOH$ or its acid addition salts with an inorganic mineral acid and/or organic acids.

2. A fertilizer formulation as claimed in claim 1, which comprises 0.001 to 5% by weight of polysulfonic acid and 0.001 to 5% by weight of nitrification inhibitors.

3. A process for the production of fertilizer formulations as claimed in claim 1, wherein the inorganic fertilizer, the slurry or the liquid fertilizer in contacted with one or more polysulfonice acids and one or more nitrification inhibitors or mixtures of these.

4. A fertilization method wherein the fertilizer formulations as claimed in claim 1 are applied to soils, into water and/or into nutrient fluids.

5. The formulation of claim 1 wherein the pyrazole of the formula (I) is 3,4-dimethyl pyrazole.

6. The formulation of claim 1 wherein the fertilizer is ammonium sulfa-nitrate.

7. The formulation of claim 8 wherein the polysulfonic acid is polynaphthalenesulfonic acid.

* * * * *